United States Patent [19]
Knell et al.

[11] Patent Number: 5,411,768
[45] Date of Patent: May 2, 1995

[54] THERMOPLASTIC/THERMOSET TABLE COATINGS OR INKS FOR GLASS CERAMIC AND OTHER HARD SURFACES

[75] Inventors: Timothy A. Knell, McMurray; Gilbert B. Burkhart, III, Washington, both of Pa.

[73] Assignee: Cerdec Corporation, Washington, Pa.

[21] Appl. No.: 241,404

[22] Filed: May 11, 1994

Related U.S. Application Data

[62] Division of Ser. No. 998,628, Dec. 30, 1992, Pat. No. 5,346,933.

[51] Int. Cl.$^6$ .................. B05D 3/02; C08L 63/02
[52] U.S. Cl. .................. 427/386; 427/282; 523/427; 525/524
[58] Field of Search .............. 427/282, 386; 523/427; 525/486, 489, 524

[56] References Cited

U.S. PATENT DOCUMENTS

| | | | |
|---|---|---|---|
| 5,100,934 | 3/1992 | Glesias | 523/456 |
| 5,346,933 | 9/1994 | Krell et al. | 523/427 |

FOREIGN PATENT DOCUMENTS 0325146 7/1989 European Pat. Off. .
1576330 10/1980 United Kingdom .

OTHER PUBLICATIONS

Lee & Neville, "Epoxy Resins", 1957, pp. 20 and 228.
Nitto Denki Kogyo K. K., Patent Abstracts of Japan, vol. 8, No. 134 (C-230) (1571) 21 Jun. 1984 JP-A-59 045 367.
Nitto Denki Kogyo K. K., Patent Abstracts of Japan, vol. 8, No. 222 (C-246) (1659) 9 Oct. 1984 JP-A-59 108 072.
Lee et al., Epoxy Resins, McGraw-Hill Book Co., Inc., 1957, pp. 20 and 28.

Primary Examiner—John C. Bleutge
Assistant Examiner—D. Aylward
Attorney, Agent, or Firm—Wenderoth, Lind & Ponack

[57] ABSTRACT

Thermoplastic/thermosettable coatings or inks for glass, ceramic or other hard surfaces are provided. The coatings comprise a blend of epoxy resins and a curing agent for the blend which provides a latency period of about 30 minutes at the screening temperature for such composition. Additional components are added to the composition depending upon the desired use. The compositions are applied to the hard surface by a high temperature screening process and heat cured on the surface.

2 Claims, No Drawings

THERMOPLASTIC/THERMOSET TABLE COATINGS OR INKS FOR GLASS CERAMIC AND OTHER HARD SURFACES

This application is a division of application Ser. No. 07/998,628, filed Dec. 30, 1992, now U.S. Pat. No. 5,346,933.

The present invention generally relates to blends of one or more epoxy resins with a curing agent which, when formulated with normal coating additives, form superior decorative and functional coatings or inks for glass, ceramics and other hard surfaces.

BACKGROUND OF THE INVENTION

Decorative and functional coatings or inks for glass, ceramics and other hard surfaces normally range from a rigid solid to a semisolid at room temperature. Normally the products are heated to a temperature in the range of about 120°–270° F. to melt or soften them for application by any one of the standard ink or coating application methods. One preferred method is the use of a heated metal screen and a rubber squeegee in a high temperature version of the "silk screen process". Ceramic inks in thermoplastic carriers are commonly applied in this manner. Following application, the coating is subjected to curing. A critical requirement for a thermoplastic/thermosettable screen ink is that it have a sufficiently wide difference between the melting or softening point—which dictates the screen temperature—and the curing temperature to provide adequate working time on the screen. If that difference is too small, the ink may be unstable on the screen and begin to gel or cure prematurely.

Conversely, if the system is formulated to be so latent that very long cure times and high temperatures are required for curing, the system is impractical for high speed production equipment and/or the thermal stability of the pigments and other additives employed becomes a concern. As employed herein the term "thermoplastic/thermosettable refers to materials which initially melt or soften upon raising the temperature above room temperature and which, upon further raising of the temperature begin to harden or set as a result of curing. By "latency period" is meant the period during which the thermoplastic/thermosettable composition can be maintained at a given temperature before becoming hardened or set.

For coating or ink compositions such as those of this invention, the choice of the curing agent(s) employed is important since the latency period must be, for example, several months at room temperature and up to several hours at temperatures of about 140° to about 270° F. In the present invention, certain specified curing agent(s) are employed.

DESCRIPTION OF THE INVENTION

The present invention provides compositions which are thermoplastic/thermosettable coatings or inks for glass, ceramics and other hard surfaces. In their broadest form the compositions comprise a blend of one or more bisphenol A, bisphenol F epoxy resins, epoxy cresyl Novolocs, epoxy phenol Novolacs and a curing agent which provides a relatively long latency period. When formulated with normal coating additives such as rheological modifiers, pigments, fillers, diluents, wetting agents, adhesion promoters, wax, flow control agents, and the like, decorative and functional coatings with excellent adhesion, appearance and durability can be made.

The bisphenol A epoxy resins are themselves well known and are made by condensing epichlorohydrin with bisphenol A (diphenylol propane) according to the following reaction:

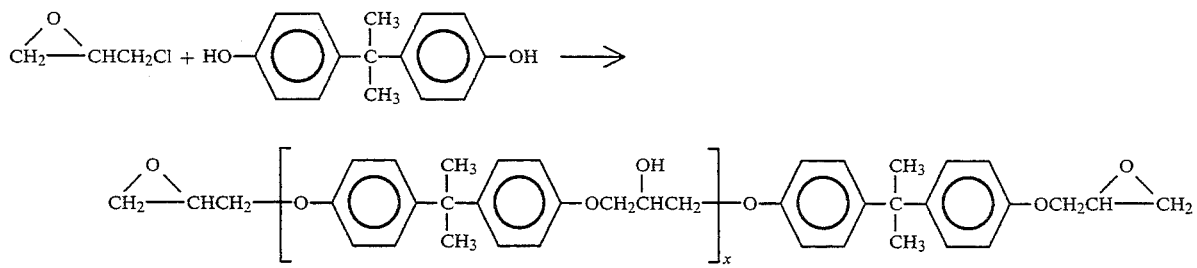

Depending upon the molecular weight, e.g., the number of repeating units x, the polymer is a viscous liquid or a solid. Examples of the bisphenol A resins are Shell EPON 828, 1001F and 1002F and CIBA Araldite GY6010 and GT6060.

The bisphenol F epoxy resins are also well known and are formed from the reaction of epichlorohydrin with bisphenol F of the formula

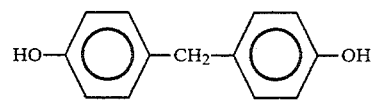

Examples of the bisphenol F resins are Ciba Araldite PY306 and GY281.

The epoxy phenol Novolacs are formed by the reaction of phenolic Novolac with epichlorohydrin. Examples of these epoxy resins are CIBA EPN1138 and EPN1139.

The epoxy cresyl Novolacs are formed from the reaction of orthocresyl Novolac or ortho cresyl formaldehyde Novolac with epichlorohydrin. Examples of these epoxy resins are CIBA ECN1235, 1273, 1280 and 1299.

Curing of the epoxy resins takes place through a reaction of the curing agent with the epoxide ring. As indicated above, in the present invention the curing agent is one which provides a relatively long latency period.

In this invention a blend of one or more liquid and one or more solid epoxy resins is employed in order to achieve the desired viscosity and melting point (melting or softening range) of the composition.

The invention offers the possibility to provide a range of compositions having different melting points which can, for example, be employed on the same substrate. For instance, in applications where several coatings or inks of different colors are to be applied to the same substrate, often the first applied coating or ink is selected to have a higher melting (screening) temperature than the second applied coating or ink. The melting (screening) temperatures of subsequently applied coatings or inks may be progressively lower.

In general, the epoxy resins employed have an epoxide equivalent weight (e.e.w.) of 150 to 2000. Small amounts of epoxy resins having higher e.e.w.'s may be added but the use of significant quantities of these may result in formulations with melting ranges and viscosities too high to be of practical value in the known coating procedures, such as screen printing. Those having higher e.e.w.'s are generally used in the known powder coatings.

In general the blends of the epoxy resins are formulated to have a viscosity in the range of 500 to 15000 cps and preferably in the range of 1000 to 10000 cps. Viscosity in this respect is determined by Brookfield HBT Viscometer at 200° F. 5RPM.

In general the melting (or softening) point of the compositions is in the range of about 10° C. to about 120° C., the preferred range being 30° C. to 80° C.

As commercially available epoxy resins which can be employed, there can be mentioned as examples those mentioned above in connection with each of the types of resins.

In the compositions of the invention the epoxy resin content ranges from about 30% to about 95% by weight of the composition. The preferred range is from about 40% to about 85% by weight.

As examples of blends of resins which can be employed, there can be mentioned a blend of about one part by weight of EPON 828 epoxy resin with about two parts by weight of EPON 1001F epoxy resin, and a blend of about one part by weight of EPON 828 with about 1.5 parts by weight of EPON 1001F.

As the curing agent in the present invention use is made of an agent which will provide a composition with a relatively long latency period, i.e., a latency period of about 30 minutes at the screening temperature employed in the coating operation.

To make a one-part epoxy system with the ability to remain molten in the screening temperature range of approximately 120°–270° F. without curing in the screen, a fairly latent curing agent is necessary. Dicyanodiamide and Dicyandiamide-aromatic amine adducts have been found to be very useful. An example is the AMICURE CG series from Pacific Anchor Chemical. It can be used with or without an accelerator to speed the curing process. Examples of accelerated dicyandiamide type curing agents are Shell's EPON Curing Agents P-101 and P-108. The majority of aliphatic primary and secondary amines are too reactive at low temperature to be useful but a variety of proprietary amine derivatives have the required latency for some applications. ANCAMINE 2014AS (Pacific Anchor Chemical) Hardener HT939 (CIBA), and the cyclic amidene products from Thorson are examples.

Anhydrides such as trimellitic anhydride, benzophenone dianhydride and pyromellitic anhydrides can be formulated to make usable compound carboxylic acid terminated polyesters and acrylics have been shown to cure with epoxies. Most tested tend to be too viscous for practical use.

The curing agent employed can be formulated with the epoxy resin blend by simply mixing it with the previously formed blend of epoxy components, or by mixing it with one of the components of the blend and subsequently mixing the resultant mixture with the other epoxy component as components.

The decorative or functional coating or ink compositions of the invention may finally be formed by combining the epoxy blend and curing agent with the other optional components to form the final desired composition. The additional components formulated in the composition will depend upon the desired use of the composition. Additional components include the following:

A. Rheological modifiers

These are employed to achieve the desired flow properties of the composition. The choice is not limited except that it must, of course, be compatible with the epoxy resin and other components of the composition. Such modifiers can be employed in amounts up to about 10% by weight of the composition. Examples of such rheological modifiers which can be employed are fumed silicas and clays. Some commercially available materials are CAB-O-SIL M-5 and TS-720 supplied by Cabot; the Aerosil series of materials supplied by Degussa; and Bentone series of modified clays supplied by NL Industries.

B. Pigments.

Pigments are employed to achieve the desired color of the composition. In general, any pigment can be employed which is compatible with the other components of the composition and is heat stable at the requisite curing temperatures. The pigments are generally employed in amounts of up to about 50% by weight of the composition. Examples of suitable pigments, are as follows:

Kronos 2220—Titanium Dioxide,
IRGAZIN DPP Red Bo—Red pigment),
Novaperm Red HF35—Red pigment,
PV Fast Yellow HGR—Yellow pigment,
Cromophtal Blue A3R—Blue pigment,

C. Fillers

Fillers may be added to adjust the desired viscosity of the composition. Such materials can be employed generally in an amount of up to about 10% by weight of the composition. Examples of such materials are calcium carbonate, silica and alumina.

D. Diluents

Diluents may also be added to adjust the viscosity of the composition to a desired level. These can be employed in amounts up to about 15% by weight of the composition. These can be reactive or non-reactive diluents. Examples of such materials are as follows:

Benzotlex S-352, 9-88, S-312 (Velsical Chemical)
Viplex 885 (Crawley Chemical)
Araldite RD1, 2-butyl glycidyl ether (Ciba-Geigy Corp.)
Araldite DY-023—cresyl-glycidyl ether (Ciba-Geigy Corp.)
RJ101 Styrene Allyl Alcohol Resin (Monsanto)
Piccolastic Styrene Resin (Hercules).

E. Wetting Agents

Wetting agents may be employed to adjust the surface characteristics of the composition. These are employed in amounts of up to about 5% by weight of the composition. Examples of such wetting agents are as follows:
Flurad series of fluorinated surfactants (3M)
Hypermer surfactants (ICI).

F. Adhesion promoters

These materials can be added to promote the adhesion of the composition to the surface of the material to which the composition is to be applied. They can be employed in amounts of up to about 5% by weight of the composition. Examples of such materials are as follows:
Silane, titanate, zirconate agents and aluminate coupling agents
Union Carbide-A-187
Kenrich-Ken React LICA 38-titanate, Ken React LZ 38-zirconate, and Ken React KA 301-aluminate,

G. Waxes

In one important aspect of this invention use can be made of up to about 10% by weight of the composition of a reactive or non-reactive wax. The wax can be added to the composition to control the tackiness of the uncured coating and to give better curing properties. Waxes can also help the gloss and scuff resistance of the coating. The blends of the epoxy resins tend not to have distinct melting points. This is especially the case for blends with the lower average e.e.w.'s. As a result they are often tacky at room temperature after they have been printed. This tackiness can adversely affect the ability to print subsequent colors. The use of fatty alcohols such as cetyl and stearyl, diols, like 1,2- and 1,12-didecanediol, and primary and secondary fatty amides with fairly distinct melting points is helpful. These materials have limited solubility or compatibility in the epoxy resin mixture. When the coating mixture is molten, these waxes are molten and reasonably soluble. They tend to act as viscosity reducers. When the coating cools, for example just after printing, they tend to bloom to the top of the film and harden or crystallize. This imparts a non-tacky surface to the film that facilitates the application of subsequent color coatings. The use of this additive can also significantly affect the sharpness of the subsequent color after curing. This aspect is described in a subsequent example herein. Powdered poly olefin and fluorocarbon waxes (SLIP-AXD) from Daniels Products are very effective.

The compositions of the invention can be formed by mixing the necessary components in the requisite amounts. The order of mixing the materials is not critical and can be chosen as convenience demands. In general, the temperature at which the formulation is made can be from about 150° F. to a temperature up to about 250° F. In general the epoxies are melted and all materials except the curing agent(s) are mixed together. The curing agent is added just prior to the final dispersion step to reduce the amount of heat the completed system sees.

The coating or ink compositions of the invention can be applied to glass, ceramic or other hard surface substrates in any manner conventionally conducted for thermoplastic/thermosettable coating or ink compositions. This generally involves heating the composition to the melting or softening temperature of the particular composition and applying it to the substrate followed by heating at the required setting or curing temperature for the composition.

In many cases, of course, a plurality of coatings, for example, of different colors, will be serially applied to a single substrate and this is conventional in the art.

EXAMPLES

The following examples are set forth to illustrate the invention. These are purely illustrative and not exhaustive of the invention. Percentages are by weight.

EXAMPLE 1

A white coating composition especially suitable for coating glass and ceramics is prepared by combining and mixing at about 200°–240° F., the following described materials in the requisite amounts.

| Formulation Component | Percent of Formulation |
| --- | --- |
| EPON 828-epoxy resin | 19.1 |
| EPON 1001 F-epoxy resin | 35.6 |
| Modaflow-flow control agent | 2.5 |
| Silane A187-Adhesion promoter | 2.1 |
| Cab-O-Sil TS-720-rheology modifier | 0.9 |
| Amicure CG-1400-dicyandiamide curing agent | 5.5 |
| Kenamide S-fatty amide wax-primary stearyl amide | 5.0 |
| Kronos 2220-titanium dioxide white pigment | 29.1 |

In formulating the composition the epoxy resins are melted and all of the components with the exception of the Amicure CG-1400 are added and mixed therewith. In the final stage the Amicure CG-1400 is added and mixed with the resultant mixture.

Example 2

A red coating composition especially suitable for coating glass and ceramics is prepared by combining and mixing at about 200° to about 240° F. the following described materials in the requisite amounts.

| Formulation Component | Percent of Formulation |
| --- | --- |
| EPON 828-epoxy resin | 31.6 |
| EPON 1001 F-epoxy resin | 47.4 |
| Modaflow-flow control agent | 2.5 |
| Silane A187-Adhesion promoter | 2.1 |
| Cab-O-Sil TS-720-rheology modifier | 1.2 |
| Amicure CG-1400-dicyandiamide curing agent | 8.1 |
| IRGAZIN DPP Red BO-red pigment | 7.1 |

The formulation of the components is in the same manner as in Example 1.

Example 3

The white coating of Example 1 is applied to a 12-ounce beverage bottle using a rotary screen printing set up. The stainless steel screen was 270 mesh and was electrically heated to about 220° F. The design was a 2"×3" rectangle. A 180 mesh screen heated to about 200° F. was used to apply an intricate pattern of the red coating of Example 2 to the bottle. Some parts of the red image overlapped the white image. The bottle with the images was cured in a forced air oven at 400° F. for 20 minutes. The cured print was hard and scratch resistant with good adhesion, gloss, and sharpness of image.

Example 4

A white coating formulation is prepared which is identical to the composition of Example I except for the omission of the Kenamide S. This formulation and the formulation of Example 1 are separately printed on glass substrates to form uniform white films. A red formulation of Example 2 also containing no Kenamide S is printed in a pattern over the separate white films and cured.

Both of the red patterns over the white films are found to have sharp images before curing. After curing at 400° F. for 20 minutes, the red image over the white coating formed from the formulation of Example 1 retains its sharpness with little or no distortion. The red image over the white coating formed from the composition containing no Kenamide S shows significant sagging and distortion of the red image. Fine details are broadened as the red pattern tends to bleed or flow out.

What is claimed is:

1. A method for the application of a coating or ink to glass, ceramic or other hard surface which comprises
   (1) heating a composition which comprises
      (a) a blend of epoxy resins selected from the group consisting of bisphenol A epoxy resin, bisphenol F epoxy resin, epoxy cresyl novolac resin and epoxy phenol novolac resin, the said epoxy resins having an epoxide equivalent weight of 150 to 2000 and the blend having a viscosity, determined by Brookfield HBT Viscometer at 200° F. 5 RPM, in the range of 500 to 15,000 cps,
      (b) a dicyandiamide curing agent for said epoxy blend which provides a latency period of about 30 minutes at a screening temperature of about 120°–270° F.,
      (c) an adhesion promoter in an amount up to about 5% by weight of the composition,
      (d) a wetting agent in an amount up to about 5% by weight of the composition, and
      (e) a rheological modifier in an amount up to about 10% by weight of the composition, the melting or softening point of said composition being in the range of about 10° C. to about 120° C.
   to the melting or softening point of the composition,
   (2) applying said melted or softened composition through a heated metal screen to a glass, ceramic or other hard surface, removing said metal screen, and
   (3) heating the resultant coating on the said surface to the curing temperature of the composition and maintaining at said temperature until curing is complete.

2. A method according to claim 1, wherein the composition additionally contains at least one of the following components
   (1) a pigment which is stable at the curing temperature of the composition in an amount of up to 50% by weight of the composition,
   (2) a filler in an amount of up to 10% by weight of the composition,
   (3) a diluent in an amount of up to 15% by weight of the composition, and
   (4) a wax in an amount of up to 10% by weight of the composition.

* * * * *